United States Patent [19]

Kano

[11] Patent Number: 5,236,494
[45] Date of Patent: Aug. 17, 1993

[54] SOLID PAINTING MATERIAL
[75] Inventor: Yoshimi Kano, Kuki, Japan
[73] Assignees: Buncho Corporation, Tokyo; Kotobuki & Co., Ltd., Kyoto, both of Japan
[21] Appl. No.: 759,911
[22] Filed: Sep. 13, 1991
[30] Foreign Application Priority Data May 15, 1991 [JP] Japan ................... 3-110291

[51] Int. Cl.$^5$ ............................................. C09D 13/00
[52] U.S. Cl. .................... 106/19 R; 106/437; 106/446; 106/505
[58] Field of Search ................. 106/19, 436, 501, 437, 106/446, 481

[56] References Cited

U.S. PATENT DOCUMENTS

| | | | |
|---|---|---|---|
| 566,845 | 9/1896 | Cross | 106/19 |
| 2,772,984 | 12/1956 | Helfaer | 106/410 |
| 2,835,604 | 5/1958 | Aronberg | 106/19 |
| 4,840,669 | 6/1989 | Hughes et al. | 106/19 |
| 5,147,457 | 9/1992 | Hino et al. | 106/19 |

OTHER PUBLICATIONS

Patent Abstracts of Japan, vol. 13, No. 532(C-659){3880}, Nov. 28, 1989, & JP-A-1-217090, S. Asada, et al., "Solid Coloring Material, Drawing Material, Correcting Agent and Fluorescent Marker".
Patent Abstracts of Japan, vol. 4, No. 190(C-37){672}, Dec. 26, 1980, & JP-A-55-127475, M. Abe, "Color Pencil Lead".
Database WPIL, No. 84-210426{34}, & JP-A-5-9-122415, "Make-Up Cosmetic-Comprises Oily and Volatile Substances, Thickening Agent, Hydrophobic Silica and Water".

Primary Examiner—Mark L. Bell
Assistant Examiner—Margaret Einsmann
Attorney, Agent, or Firm—Oblon, Spivak, McClelland, Maier & Neustadt

[57] ABSTRACT

A solid painting material comprises an alkali metal or ammonium salt of an aliphatic carboxylic acid having 8 to 36 carbon atoms as a gel-forming agent, 1 to 70% by weight of a coloring agent, 1 to 20% by weight of hydrophobic silica and 0.1 to 30% by weight of a water-soluble resin, wherein the amounts are based on the total weight of the solid painting material. The solid painting material has good painting properties and fixing ability as well as painting properties in overlap-painting. Further, if the solid painting material comprises a white pigment as a coloring agent, it can be used as a correcting agent as well.

14 Claims, No Drawings

SOLID PAINTING MATERIAL

BACKGROUND OF THE INVENTION

The present invention relates to a solid painting material and in particular to a solid painting material which is excellent in painting properties and fixing ability, which has good painting properties even in overlap-painting and which can likewise be used as a solid correcting agent.

Painting materials such as crayons and pastels which have conventionally been used suffer from various problems. For instance, they cannot provide any smooth coated surface, it is difficult for the materials to uniformly coat a wide area and, therefore, they have painting properties lower than those observed for liquid painting materials such as water colors and oil colors, they have low fixing ability since the coated surface is not easily dried and is easily contaminated and further the color is not firmly held on the coated surface and finally it is difficult to use for overlap-painting.

To eliminate these disadvantages, Japanese Unexamined Patent Publication (hereinafter referred to as "J.P. KOKAI") No. Hei 1-217090 discloses a solid coloring material which comprises an alkali metal or ammonium salt of an aliphatic carboxylic acid as a gel-forming agent, a coloring material, a thixotropic agent such as an organic bentonite, and a water repellant such as a lubricant or a wax. This solid coloring material has improved coating properties and fixing ability. However, the painting properties and fixing ability of the solid painting material as well as painting properties upon overlap-painting thereof are still insufficient and must be further improved.

SUMMARY OF THE INVENTION

Accordingly, an object of the present invention is to provide a solid painting material which is excellent in painting properties, fixing ability and painting properties upon overlap-painting.

Other objects, features and effects of the present invention will become apparent from the following description.

The foregoing object of the present invention can effectively be attained by providing a solid painting material which comprises an alkali metal or ammonium salt of an aliphatic carboxylic acid having 8 to 36 carbon atoms as a gel-forming agent, 1 to 70% by weight of a coloring agent, 1 to 20% by weight of hydrophobic silica and 0.1 to 30% by weight of a water-soluble resin, the amounts being on the basis of the total weight of the material.

DESCRIPTION OF THE PREFERRED EMBODIMENTS

The salts of aliphatic carboxylic acids used in the invention are alkali metal salts or ammonium salts of linear or branched aliphatic carboxylic acids having 8 to 36 carbon atoms and in particular preferred are such salts of aliphatic carboxylic acids having 12 to 18 carbon atoms. Specific examples of the aliphatic carboxylic acid moieties include caprylic acid, pelargonic acid, capric acid, undecanoic acid, lauric acid, myristic acid, palmitic acid, stearic acid, arachic acid, behenic acid, lignoceric acid, cerotic acid, montanic acid and melissic acid.

Examples of the alkali metal salts of aliphatic carboxylic acids are lithium salts, sodium salts and potassium salts and, in particular, sodium myristate, sodium palmitate, sodium stearate and mixture thereof.

The amount of the aliphatic carboxylate to be used ranges from 5 to 30% by weight and preferably 8 to 20% by weight on the basis of the total weight of the solid painting material. This is because, if the amount thereof is less than 5% by weight, the resulting solid painting material is hardly solidified and hence hardly causes gelation, while if it exceeds 30% by weight, these salts inhibit the functions of the hydrophobic silica and thixotropic agent and correspondingly the resulting solid painting material has poor coating properties.

The coloring agents used herein are not limited to specific ones and can arbitrarily be selected from known pigments and dyes. Specific examples thereof include inorganic pigments such as iron black, iron yellow, red iron oxide, ultramarine blue, Prussian blue, alumina white, carbon black, aluminum powder, bronze powder and mica; organic pigments such as nitroso or nitro pigments, e.g., Naphthol Green and Naphthol Yellow, azolake pigments, e.g., Lithol Red, Lake Red C, Brilliant Carmine 6B, Watching Red and Bordeaux 10B, insoluble azo pigments, e.g., Fast Yellow, Dis-azo Yellow, Pyrazolone Orange, Para Red, Lake Red 4R and Naphthol Red, condensed azo pigments, e.g., Chromophthal Yellow and Chromophthal Red, dyeing lake pigments, e.g., Peacock Blue Lake, Alkali Blue Lake, Rhodamine Lake, Methyl violet Lake and Malachite Green Lake, Phthalocyanine pigments, e.g., Phthalocyanine Blue, Fast Sky Blue and Phthalocyanine Green, threne pigments, e.g., anthrapyrimidine Yellow, Perynone Orange, Perylene Red, Thioindigo Red and Indanethrone Blue, quinacridone pigments, e.g., Quinacridone Red and Quinacridone Violet, dioxazine pigments, e.g., dioxazine Violet, isoindolinone pigments, e.g. Isoindolinone Yellow, and fluorescent pigments; and white pigments such as titanium oxide, zinc white, lead white, zinc sulfide, antimony oxide, alumina white, satin white and barium sulfate. Titanium oxide is particularly preferred as white pigment.

The amount of the coloring agents, on the basis of the total weight of the solid painting material, ranges preferably from 5 to 40% by weight, more preferably 10 to 35% by weight for inorganic pigments and preferably from 1 to 15% by weight, more preferably 2 to 10% by weight for organic pigments. When the solid painting material is used as a correcting agent, it is preferred to use white pigments in an amount ranging from 25 to 70% by weight on the basis of the total weight of the material.

The hydrophobic silica used in the invention is in the form of fine particles of silicon dioxide having high purity and the surface thereof is hydrophobic within the solid painting material. The silica may be treated for making the surface thereof hydrophobic in advance or the surface thereof can be made hydrophobic in-situ during the preparation of the solid painting material. The hydrophobic silica fine particles used in the invention have a particle size ranging from 0.02 to 15 m·$\mu$ and a specific surface area ranging from 1 to 700 m$^2$/g. In this respect, silica which is made hydrophobic has been put on the market and examples thereof include Rheosil MT-10 (available from Tokuyama Soda Co., Ltd.), Nipsil SS (available from Nippon Silica Industrial Co., Ltd.) and Aerosil R-972 hydrophobic silica (available from Nippon Aerosil Co., Ltd.). The amount of the hydrophobic silica ranges from 1 to 20% by weight and preferably 3 to 15% by weight on the basis of the total weight of the solid painting material.

The use of the hydrophobic silica ensures the improvement in fluidability, viscosity and thixotropic properties of the solid painting material and it in turn leads to enhanced applicability of the solid painting material to substances to be painted. Further, it prevents the repulsion of an ink, the running of an ink on the substance to be painted and the tinting of an ink, and the color tone of the ink becomes clear, when a water-base ink is applied onto the surface coated with the painting material. In addition, when an oil-base ink is applied onto the surface coated with the painting material, in particular the surface is written in with a ball-point pen, the ink film is easily dried and the ink spreads well. As has explained above, the hydrophobic silica plays an important role in the improvement of the coating properties and fixing ability of the solid painting material as well as painting properties thereof in overlap-painting.

The water-soluble resin used in the invention is a natural or synthetic resin generally having a degree of polymerization ranging from 100 to 3,000 and preferably 100 to 1,500. The amount of the water-soluble resin to be used ranges from 0.1 to 30% by weight and preferably 0.5 to 20% by weight on the basis of the total weight of the solid painting material. If the water soluble resin is used in an amount falling within the range defined above, the solid painting material is strongly adhered to the surface of a substance to be painted and correspondingly the coated material is never peeled off even if it is accidentally rubbed with something. Specific examples of the water-soluble resins are natural polymers such as gum arabic and dextrin; cellulosic semi-synthetic polymers such as methyl cellulose, ethyl cellulose, hydroxyethyl cellulose and carboxymethyl cellulose; and synthetic polymers such as polyvinyl pyrrolidone, polyvinyl alcohol, polyvinyl acetate and acryl emulsion.

The water content of the solid painting material is generally controlled so as to fall within the ranges of from 20 to 60% by weight and preferably 25 to 55% by weight. This is because, if the water content is less than 20% by weight, the coating properties and painting properties of the resulting solid painting material are lowered and the coated surface becomes uneven. On the other hand, if it exceeds 60% by weight, the strength of the resulting solid painting material is lowered and it is broken and/or falls to pieces. In this connection, if the water content increases, it takes a long period of time for drying the coated surface. However, the drying time can be reduced by simultaneously using a highly volatile organic solvent.

The solid painting material may optionally comprise a polyhydric alcohol, an alcohol ether and/or ethanolamine in an amount of 0 to 6% by weight on the basis of the total weight of the painting material, for making the coated film of the material flexible and hence for preventing the peeling off of the painting material. This is because if the amount of the additives such as polyhydric alcohol exceeds 6% by weight, the resulting film of the material is too soft to easily perform overlap-coating.

Further, the solid painting material may optionally comprise a thixotropic agent such as an organic bentonite and an inorganic bentonite. The amount of the thixotropic agent ranges from 0 to 5% by weight and preferably 1 to 4% by weight on the basis of the total weight of the painting material. This is because if the amount thereof exceeds 5% by weight, the viscosity of the resulting material increases and correspondingly the production of the material becomes difficult. In addition, the solid painting material may comprise a lubricant such as metal salts of aliphatic acids, for instance, aluminum stearate and zinc laurate and the amount thereof to be used ranges from 0.1 to 1% by weight. The lubricant is added to the painting material for enhancing the thixotropic properties of the material and, in turn, for improving the coating properties thereof.

The solid painting material can be prepared by first adding desired amounts of an aliphatic carboxylic acid salt and a water soluble resin to a predetermined amount of water while stirring and heating under reflux at about 90° C. to dissolve these substances in water, then adding a coloring agent and hydrophobic silica which have separately been dispersed in water to the resulting solution, stirring the resulting mixture and packing the solid painting material in a collapsible container or cooling to solidify or extrusion-molding into a rod-like product and then introduced into a closed container with a cap.

According to the present invention, there is provided a solid painting material having good painting properties and fixing ability as well as painting properties in overlap painting. Therefore, there can be painted on substrate such as paper with the solid painting material. Further, if the solid painting material comprises a white pigment as a coloring agent, it can be used as a correcting agent as well.

The present invention will hereunder be described in more detail with reference to the following working Examples.

EXAMPLE 1

A solid painting material according to the present invention was prepared. The material had the following formulation:

| Component | Amount (part by weight) |
| --- | --- |
| water | 52 |
| polyvinyl pyrrolidone (Lubiscol K-90, available from BASF Corporation) | 17 |
| sodium stearate (Efcochem B, available from Adeca Fine Chemical Co., Ltd.) | 17 |
| hydrophobic silica (Aerosil R-972, available from Nippon Aerosil Co., Ltd.) | 13 |
| Hansa Yellow 10G (available from Hoechst Company) | 1 |

In this Example, the solid painting material was prepared by adding predetermined amounts of water, the aliphatic carboxylic acid salt and the water-soluble resin to a container equipped with a stirring machine and a thermometer while stirring and heating under reflux at 90° C., then adding predetermined amounts of Hansa Yellow 10G and hydrophobic silica which had separately been mixed and dispersed together to the resulting mixed solution, stirring the resulting mixture sufficiently extrusion-molding the solid painting material thus produced into a rod-like product and then introduced into a closed container with a cap.

EXAMPLE 2

A solid painting material according to the present invention was prepared. The material had the following formulation:

| Component | Amount (part by weight) |
| --- | --- |
| water | 33 |
| hydroxyethyl cellulose (HEC-QP9H, available from Daicel Chemical Industries, Ltd.) | 10 |
| sodium stearate (Efcochem B-65, available from Adeca Fine Chemical Co., Ltd.) | 30 |
| hydrophobic silica (Rheosil MT-10, available from Tokuyama Soda Co., Ltd.) | 4 |
| ethylene glycol | 3 |
| titanium oxide (Tipaque R-550, available from Ishihara Sangyo Kaisha, Ltd.) | 18 |
| Carmine B6 (available from Dainippon Ink & Chemicals, Incorporated) | 2 |

A solid painting material was prepared in the same manner used in Example 1 except that the composition thereof differed from that of the material formed in Example 1.

EXAMPLE 3

A solid painting material according to the present invention was prepared. The material had the following formulation:

| Component | Amount (part by weight) |
| --- | --- |
| water | 49 |
| isobutyl alcohol | 4 |
| polyvinyl alcohol (Gosenol GH-20, available from The Nippon Synthetic Chemical Industry Co., Ltd.) | 11 |
| sodium salt of mixed aliphatic acids (Flakemarcel, available from Kao Corporation) | 19 |
| hydrophobic silica (Aerosil R202, available from Nippon Aerosil Co., Ltd.) | 12 |
| pink fluorescent pigment (NKV-S-7, available from Nippon Fluorescent Co., Ltd.) | 5 |

A solid painting material was prepared in the same manner used in Example 1 except that the composition thereof differed from that of the material formed in Example 1.

EXAMPLE 4

A solid painting material according to the present invention was prepared. The material had the following formulation:

| Component | Amount (part by weight) |
| --- | --- |
| water | 25 |
| polyvinyl pyrrolidone (Lubiscol K-90, available from BASF Corporation.) | 8 |
| sodium stearate (Efcochem B, available from Adeca Fine Chemical Co., Ltd.) | 8 |
| hydrophobic silica (Aerosil R-972, available from Nippon Aerosil Co., Ltd.) | 6 |
| titanium oxide (TA-500, available from Fuji Titanium Industries, Ltd.) | 53 |

A solid painting material was prepared in the same manner used in Example 1 except that the composition thereof differed from that of the material formed in Example 1.

COMPARATIVE EXAMPLE 1

A solid painting material was prepared using the same formulation and method as those used in Example 4 except that usual silica, i.e., hydrophilic silica (Aerosil #200, available from Nippon Aerosil Co., Ltd.) was substituted for the hydrophobic silica used in Example 4.

EXAMPLE 5

A solid painting material according to the present invention was prepared. The material had the following formulation:

| Component | Amount (part by weight) |
| --- | --- |
| water | 22 |
| hydroxyethyl cellulose (HEC-QP9H, available from Daicel Chemical Industries, Ltd.) | 7 |
| sodium stearate (Efcochem B-65, available from Adeca Fine Chemical Co., Ltd.) | 20 |
| hydrophobic silica (Rheosil MT-10, available from Tokuyama Soda Co., Ltd.) | 3 |
| ethylene glycol | 2 |
| titanium oxide (Typeke R-550, available from Ishihara Sangyo Kaisha, Ltd.) | 46 |

A solid painting material was prepared in the same manner used in Example 4 except that the composition thereof differed from that of the material formed in Example 4.

Comparative Example 2

A solid painting material was prepared using the same formulation and method as those used in Example 5 except that hydrophilic silica (Tokusil U, available from Tokuyama Soda Co., Ltd.) was substituted for the hydrophobic silica used in Example 5.

EXAMPLE 6

A solid painting material according to the present invention was prepared. The material had the following formulation:

| Component | Amount (part by weight) |
| --- | --- |
| water | 26 |
| isobutyl alcohol | 2 |
| polyvinyl alcohol (Gosenol GH-20, available from Nippon Synthetic Chemical Industry Co., Ltd.) | 6 |
| sodium salt of mixed aliphatic acids (Flakemarcel, available from Kao Corporation) | 10 |
| hydrophobic silica (Aerosil R202, available from Nippon Aerosil Co., Ltd.) | 6 |
| titanium oxide (TCR-30, available from Tohoku Chemical Industries Co., Ltd.) | 50 |

A solid painting material was prepared in the same manner used in Example 4 except that the composition thereof differed from that of the material formed in Example 4.

COMPARATIVE EXAMPLE 3

A solid painting material was prepared. The material had the following formulation:

| Component | Amount (part by weight) |
| --- | --- |
| water | 26 |
| isobutyl alcohol | 2 |
| polyvinyl alcohol (Gosenol GH-20, available | 6 |

-continued

| Component | Amount (part by weight) |
|---|---|
| from Nippon Synthetic Chemical Industry Co., Ltd.) | |
| sodium salt of mixed aliphatic acids (Flake-marcel, available from Kao Corporation) | 10 |
| hydrophilic silica (Nipsil E200, available from Nippon Silica Industrial Co., Ltd.) | 6 |
| titanium oxide (TCR-30, available from Tohoku Chemical Industries Co., Ltd.) | 47 |
| paraffin wax (145°, available from Nippon Petroleum Refining Company, Ltd.) | 3 |

A solid painting material was prepared in the same manner used in Example 4 except that the composition thereof differed from that of the material formed in Example 4.

EVALUATION OF SOLID PAINTING MATERIAL

The quality of the solid painting material of the present invention was evaluated in comparison with commercially available crayons, water-base crayons, pastels, color pencils and ball-point pens.

(1) Fixing Ability

The solid painting materials of the present invention and commercially available painting materials were applied onto paper, paper was put thereon and it was determined whether each painting material applied to the paper was transferred to the superposed paper or not. As a result, the painting materials other than those obtained in Examples 1 to 3 coated on the paper were transferred to the superposed paper and they were thus found to be insufficient in fixing ability.

(2) Painting Properties In Overlap-Painting

Overlap-coating test was performed using the painting materials listed in the following Table 1. This test was carried out by first coating paper with the painting material listed in the column A of Table 1 and then coating the paper with that listed in the column B. The results obtained were evaluated on the basis of the following criteria:

◯: the painting materials could be beautifully overlap-painted.

△: the overlap-painting of these painting materials were possible, but the colors were mixed, faded and a part of the lower material was scraped off.

✗: the overlap-painting could not be performed.

TABLE 1

| | Column B | | | | | | | |
|---|---|---|---|---|---|---|---|---|
| Column A | Ex. 1 | Ex. 2 | Ex. 3 | Crayon | Aqueous Crayon | Pastel | Color Pencil | Ball-Point Pen |
| Ex. 1 | ◯ | ◯ | ◯ | ◯ | ◯ | ◯ | ◯ | ◯ |
| Ex. 2 | ◯ | ◯ | ◯ | ◯ | ◯ | ◯ | ◯ | ◯ |
| Ex. 3 | ◯ | ◯ | ◯ | ◯ | ◯ | ◯ | ◯ | ◯ |
| Crayon | △ | △ | △ | △ | △ | ✗ | ✗ | ✗ |
| Aq. Crayon | △ | △ | △ | △ | △ | ✗ | ✗ | ✗ |
| Pastel | △ | △ | △ | ✗ | ✗ | △ | ✗ | ✗ |
| Color Pencil | ◯ | ◯ | ◯ | △ | △ | △ | △ | △ |

EVALUATION OF SOLID PAINTING MATERIAL WHEN IT WAS USED AS SOLID CORRECTING AGENT

The effect attained when the solid painting material was used as a correcting agent was also evaluated. Each of the solid painting materials obtained in Examples 4 to 6 and Comparative Examples 1 to 3 was applied to wood-free paper and then an water-base ink was applied to the surface to which the material was applied with a fountain pen or a aqueous marking pen for determining the writing quality of the water-base ink, or an oil-base ink was likewise applied with an oil ball-point pen for determining the writing quality of an oil-base ink. The results thus obtained are summarized in the following Table 2.

Each evaluation was performed on the basis of the following evaluation criteria:

(1) Coating Properties of Solid Painting Material as Correcting Agent

◯: good; △: medium; ✗: not good

(2) Evaluation of Writing Quality of Water-Base Ink

| Repulsion of ink: | ◯: good; | △: medium; | ✗: not good |
|---|---|---|---|
| Blotting of Ink: | ◯: good; | △: medium; | ✗: not good |
| Tinting of Ink: | ◯: good; | △: medium; | ✗: not good |
| Color Tone of Ink: | ◯: good; | △: medium; | ✗: not good |

(3) Evaluation of Writing Quality of Oil-Base Ink

Spreading of Ink: ◯: good; △: medium; ✗: not good (In case where blurring of lines were observed)

TABLE 2

| Ex. No. | Coating Properties | Water-Base Ink | | | | Oil-Base Ink |
|---|---|---|---|---|---|---|
| | | Repulsion | Blotting | Tinting | Color Tone | |
| 4 | ◯ | ◯ | ◯ | ◯ | ◯ | ◯ |
| 1* | ◯ | ◯ | ✗ | ◯ | △ | △ |
| 5 | △ | ◯ | ◯ | ◯ | ◯ | ◯ |
| 2* | △ | ◯ | ✗ | ◯ | ✗ | △ |
| 6 | ◯ | ◯ | ◯ | ◯ | ◯ | ◯ |
| 3* | ◯ | ✗ | ◯ | △ | ◯ | ✗ |

*Comparative Example

What is claimed is:

1. A solid painting material comprising an alkali metal or ammonium salt of an aliphatic carboxylic acid having 8 to 36 carbon atoms as a gel-forming agent, 1 to 70% by weight of a coloring agent, 1 to 20% by weight of hydrophobic silica, from 20 to 60% by weight of water, and 0.1 to 30% by weight of a water-soluble resin, the amounts being based on the total weight of the solid material.

2. The solid painting material of claim 1 wherein an amount of the alkali metal or ammonium salt of aliphatic carboxylic acid ranges from 5 to 30% by weight on the basis of the total weight of the material.

3. The solid painting material of claim 2 wherein the amount of the alkali metal or ammonium salt of aliphatic carboxylic acid ranges from 8 to 20% by weight on the basis of the total weight of the material.

4. The solid painting material of claim 1 wherein the aliphatic carboxylic acid moiety of the salt is an aliphatic acid having 12 to 18 carbon atoms.

5. The solid painting material of claim 1 wherein the coloring agent is a white pigment and the white pigment is in an amount ranging from 25 to 70% by weight on the basis of the total weight of the material.

6. The solid painting material of claim 5 wherein the white pigment is titanium oxide.

7. The solid painting material of claim 1 wherein the coloring agent is an inorganic coloring agent and the amount thereof ranges from 5 to 40% by weight.

8. The solid painting material of claim 1 wherein the coloring agent is an organic coloring agent and the amount thereof ranges from 1 to 15% by weight.

9. The solid painting material of claim 1 wherein the hydrophobic silica is highly pure fine particles of silicon dioxide whose surface is made hydrophobic.

10. The solid painting material of claim 9 wherein the hydrophobic silica has a particle size ranging from 0.02 to 15 m$\mu$ and a specific surface area ranging from 1 to 700 m$^2$/g.

11. The solid painting material of claim 1 wherein the hydrophobic silica is used in an amount ranging from 3 to 15% by weight on the basis of the total weight of the material.

12. The solid painting material of claim 1 wherein the water-soluble resin has a degree of polymerization ranging from 100 to 3,000.

13. The solid painting material of claim 1 wherein the water-soluble resin is used in an amount ranging from 0.5 to 20% by weight on the basis of the total weight of the material.

14. The solid painting material of claim 1 wherein it further comprises a member selected from the group consisting of a polyhydric alcohol, an alcohol ether, an ethanolamine and mixtures thereof in an amount ranging from 0 to 6% by weight on the basis of the total weight of the material.

* * * * *